United States Patent
Ryu et al.

(10) Patent No.: US 12,114,272 B2
(45) Date of Patent: Oct. 8, 2024

(54) GAIN CONTROL IN SIDELINK

(71) Applicant: QUALCOMM Incorporated, San Diego, CA (US)

(72) Inventors: Jung Ho Ryu, Fort Lee, NJ (US); Sony Akkarakaran, Poway, CA (US); Tao Luo, San Diego, CA (US); Junyi Li, Fairless Hills, PA (US); Xiaojie Wang, Hillsborough, NJ (US); Wooseok Nam, San Diego, CA (US); Yan Zhou, San Diego, CA (US); Peter Gaal, San Diego, CA (US); Juan Montojo, San Diego, CA (US); Piyush Gupta, Bridgewater, NJ (US); Xiaoxia Zhang, San Diego, CA (US); Hua Wang, Basking Ridge, NJ (US); Kobi Ravid, Closter, NJ (US); Lik Hang Silas Fong, Bridgewater, NJ (US); Chih-Hao Liu, San Diego, CA (US); Jing Sun, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/647,727

(22) Filed: Jan. 11, 2022

(65) Prior Publication Data
US 2023/0224831 A1    Jul. 13, 2023

(51) Int. Cl.
*H04W 52/52* (2009.01)
*H04W 52/42* (2009.01)
*H04W 92/18* (2009.01)

(52) U.S. Cl.
CPC ........... *H04W 52/52* (2013.01); *H04W 52/42* (2013.01); *H04W 92/18* (2013.01)

(58) Field of Classification Search
CPC ...... H04W 52/52; H04W 52/42; H04W 92/18
See application file for complete search history.

(56) References Cited

U.S. PATENT DOCUMENTS

| | | | |
|---|---|---|---|
| 9,270,312 B2* | 2/2016 | Park | H03G 3/3068 |
| 10,917,274 B2* | 2/2021 | Werner | H04L 27/26 |

(Continued)

FOREIGN PATENT DOCUMENTS

| | | | |
|---|---|---|---|
| CN | 111181710 A | 5/2020 | |
| CN | 113632582 A | 11/2021 | |

(Continued)

OTHER PUBLICATIONS

3GPP TR 37.985 V17.0.0 (Dec. 2021) 3rd Generation Partnership Project: "Technical Specification Group Radio Access Network: Overall description of Radio Access Network (RAN) aspects for Vehicle-to-everything (V2X) based on LTE and NR (Release 17)", 3rd Generation Partnership Project, Mobile Competence Centre, 650, Route Des Lucioles, F-06921 Sophia-Antipolis Cedex, France, No. V17.0.0, Jan. 5, 2022, pp. 1-37, XP052118397.

(Continued)

*Primary Examiner* — Chandrahas B Patel
(74) *Attorney, Agent, or Firm* — Patterson + Sheridan, LLP

(57) ABSTRACT

Certain aspects of the present disclosure provide techniques for wireless communications by a user equipment (UE) includes transmitting, in a first symbol in time of a slot, an automatic gain control (AGC) signal, wherein the UE transmits the AGC signal at a first power over a first frequency bandwidth; and transmitting, in a plurality of symbols of a mini-slot of the slot, a second AGC signal and data, wherein the UE refrains from transmitting between the first symbol and the plurality of symbols.

25 Claims, 8 Drawing Sheets

(56) References Cited

U.S. PATENT DOCUMENTS

| | | | |
|---|---|---|---|
| 11,616,562 B1 | 3/2023 | Pratas et al. | |
| 2009/0268678 A1* | 10/2009 | Huo | H04B 17/318 |
| | | | 370/329 |
| 2020/0145079 A1 | 5/2020 | Marinier et al. | |
| 2020/0313706 A1 | 10/2020 | Gulati et al. | |
| 2021/0022139 A1 | 1/2021 | Shin et al. | |
| 2022/0104126 A1* | 3/2022 | Lee | H04W 52/0219 |
| 2022/0201629 A1* | 6/2022 | Ko | H04J 13/00 |
| 2023/0224829 A1 | 7/2023 | Ryu et al. | |
| 2023/0224830 A1 | 7/2023 | Ryu et al. | |
| 2024/0064664 A1 | 2/2024 | Ryu et al. | |

FOREIGN PATENT DOCUMENTS

| | | | |
|---|---|---|---|
| EP | 3413638 A1 | 12/2018 | |
| EP | 3910969 A1 | 11/2021 | |
| WO | 2020142999 A1 | 7/2020 | |
| WO | 2021034572 A1 | 2/2021 | |

OTHER PUBLICATIONS

Garcia M.H.C., et al., "A Tutorial on 5G NR V2X Communications", in IEEE Communications Surveys and Tutorials, vol. 23, No. 3, Third Quarter, Arxiv.Org, Cornell University Library, 201 Olin Library Cornell University, Ithaca, NY 14853, Feb. 8, 2021, XP081877162, pp. 1-55, p. 18-p. 21, figures 8, 10, 14, sections V.A.1), V.B, V.B.5), V. C.6), VI.B, VII.C, VIII.B, pp. 1972-2026, p. 12-p. 13, p. 28.

Harounabadi M., et al., "V2X in 3GPP Standardization: NR Sidelink in Rel-16 and Beyond", arxiv.org, Cornell University Library, 201 Olin Library Cornell University Ithaca, NY, 14853, Apr. 22, 2021, pp. 1-10.

Huawei., et al., "UL Power Control for Short TTI", 3GPP TSG RAN WG1 Meeting #88, R1-1701738, 3rd Generation Partnership Project, Mobile Competence Centre, 650, Route Des Lucioles, F-06921 Sophia-Antipolis Cedex, France, vol. RAN WG1, No. Athens, Greece, 20170213-20170217, Feb. 6, 2017, 4 Pages.

Intel Corporation: "Considerations on Support of Short TTI for LTE V2V Sidelink Communication", 3GPP TSG RAN WG1 Meeting #89, R1-1707307, 3rd Generation Partnership Project, Mobile Competence Centre, 650, Route Des Lucioles, F-06921 Sophia-Antipolis Cedex, France, vol. RAN WG1, No. Hangzhou, 20170515-20170519, May 14, 2017, pp. 1-8, XP051272520.

Intel Corporation: "Synchronization Framework for NR V2X Sidelink Communication", 3GPP TSG RAN WG1 Meeting #95, R1-1812490, 3rd Generation Partnership Project, Mobile Competence Centre, 650, Route Des Lucioles, F-06921 Sophia-Antipolis Cedex, France, vol. RAN WG1, No. Spokane, USA, 20181112-20181116, Nov. 11, 2018, pp. 1-13, XP051554434.

Samsung: "Summary#2 of discussion on PSSCH DMRS patterns and for the number of PSSCH symbols", 3GPP TSG RAN1#99 R1-1913576, 3rd Generation Partnership Project, Mobile Competence Centre, 650, Route Des Lucioles, F-06921 Sophia-Antipolis Cedex, France, vol. RAN WG1, No. Reno, USA, Nov. 18, 2019-Nov. 22, 2019, Nov. 25, 2019, 19 Pages, XP051830853.

\* cited by examiner

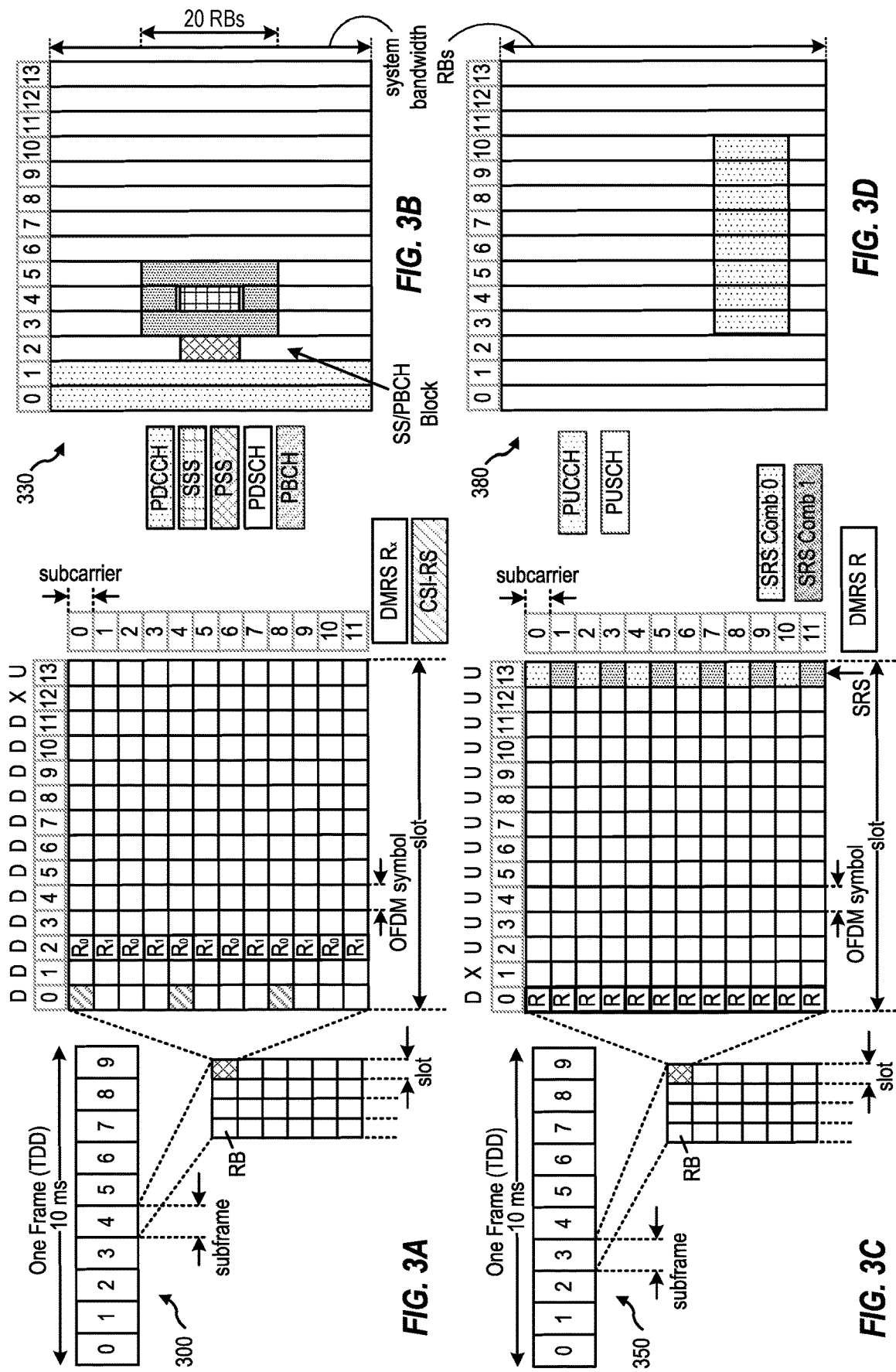

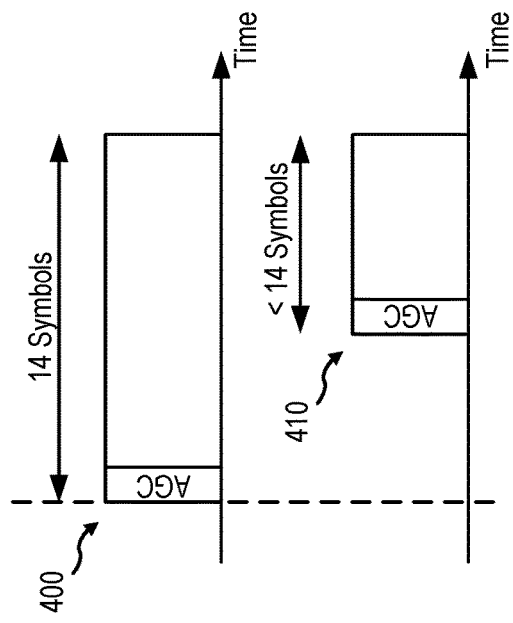
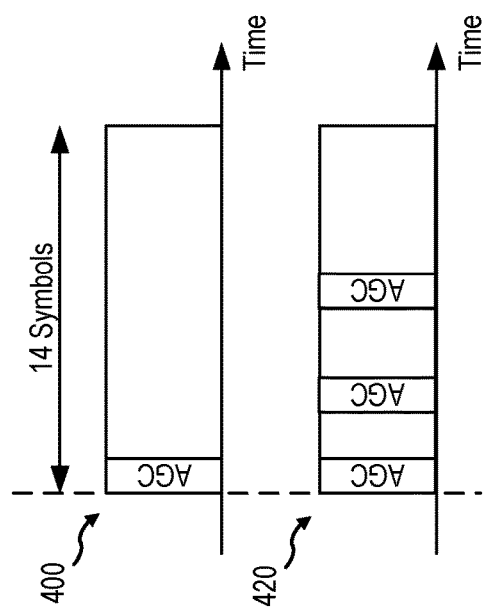
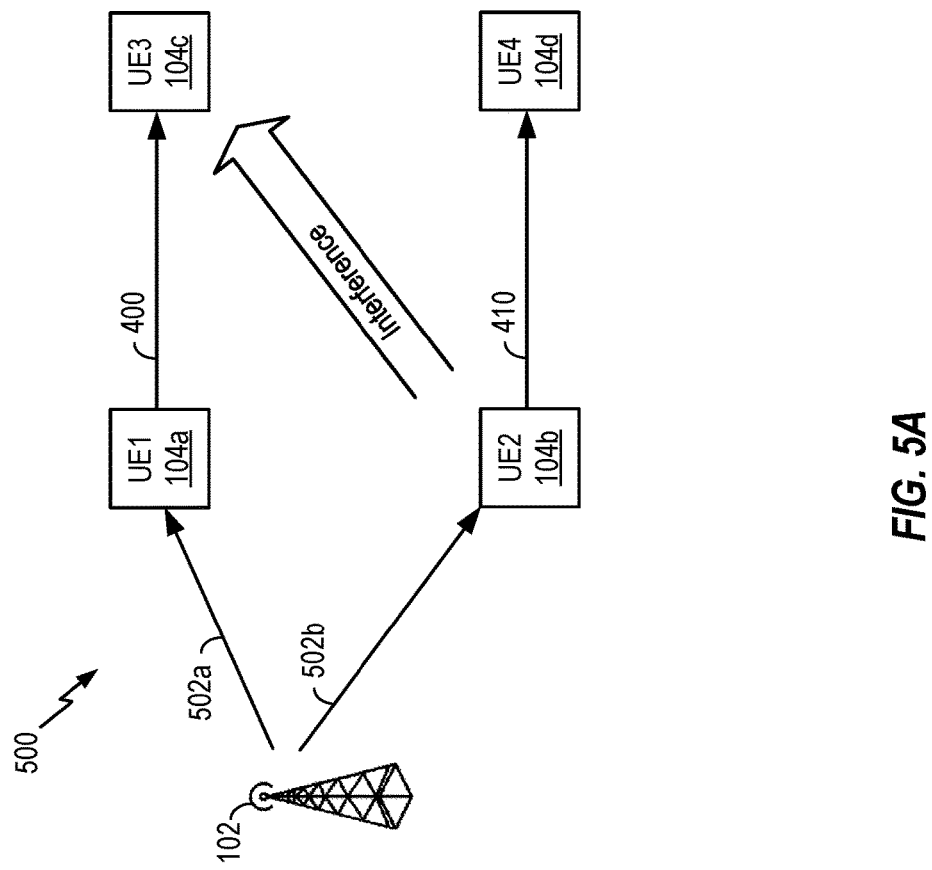

GAIN CONTROL IN SIDELINK

INTRODUCTION

Aspects of the present disclosure relate to wireless communications, and more particularly, to techniques for gain control in sidelink communications.

Wireless communication systems are widely deployed to provide various telecommunication services such as telephony, video, data, messaging, broadcasts, or other similar types of services. These wireless communication systems may employ multiple-access technologies capable of supporting communication with multiple users by sharing available system resources with those users (e.g., bandwidth, transmit power, or other resources). Multiple-access technologies can rely on any of code division, time division, frequency division, orthogonal frequency division, single-carrier frequency division, or time division synchronous code division, to name a few. These and other multiple access technologies have been adopted in various telecommunication standards to provide a common protocol that enables different wireless devices to communicate on a municipal, national, regional, and even global level.

Although wireless communication systems have made great technological advancements over many years, challenges still exist. For example, complex and dynamic environments can still attenuate or block signals between wireless transmitters and wireless receivers, undermining various established wireless channel measuring and reporting mechanisms, which are used to manage and optimize the use of finite wireless channel resources. Consequently, there exists a need for further improvements in wireless communications systems to overcome various challenges.

SUMMARY

In one aspect, a method for wireless communications by a user equipment (UE) includes transmitting, in a first symbol in time of a slot, an automatic gain control (AGC) signal, wherein the UE transmits the AGC signal at a first power over a first frequency bandwidth; and transmitting, in a plurality of symbols of a mini-slot of the slot, a second AGC signal and data, wherein the UE refrains from transmitting between the first symbol and the plurality of symbols.

In one aspect, a UE is described. The UE includes a memory and a processor coupled to the memory. The memory and the processor are configured to cause the UE to: transmit, in a first symbol in time of a slot, an AGC signal, wherein the UE transmits the AGC signal at a first power over a first frequency bandwidth; and transmit, in a plurality of symbols of a mini-slot of the slot, a second AGC signal and data, wherein the UE refrains from transmitting between the first symbol and the plurality of symbols.

In one aspect, a non-transitory computer readable medium storing code for wireless communication is described. In some examples, the code comprises instructions executable by a processor to cause a UE to: transmit, in a first symbol in time of a slot, an AGC signal, wherein the UE transmits the AGC signal at a first power over a first frequency bandwidth; and transmit, in a plurality of symbols of a mini-slot of the slot, a second AGC signal and data, wherein the UE refrains from transmitting between the first symbol and the plurality of symbols.

In one aspect, a UE for wireless communications is described. The UE includes: means for transmitting, in a first symbol in time of a slot, an automatic gain control (AGC) signal, wherein the UE transmits the AGC signal at a first power over a first frequency bandwidth; and means for transmitting, in a plurality of symbols of a mini-slot of the slot, a second AGC signal and data, wherein the UE refrains from transmitting between the first symbol and the plurality of symbols.

Other aspects provide: an apparatus operable, configured, or otherwise adapted to perform the aforementioned methods as well as those described elsewhere herein; a non-transitory, computer-readable media comprising instructions that, when executed by one or more processors of an apparatus, cause the apparatus to perform the aforementioned methods as well as those described elsewhere herein; a computer program product embodied on a computer-readable storage medium comprising code for performing the aforementioned methods as well as those described elsewhere herein; and an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF THE DRAWINGS

The appended figures depict certain features of the various aspects described herein and are not to be considered limiting of the scope of this disclosure.

FIGS. 3A-3D depict various example aspects of data structures for a wireless communication network.

FIGS. 5A-5C are diagrams illustrating an example communication network and example slot structures communicated in the network.

DETAILED DESCRIPTION

Figure 1:
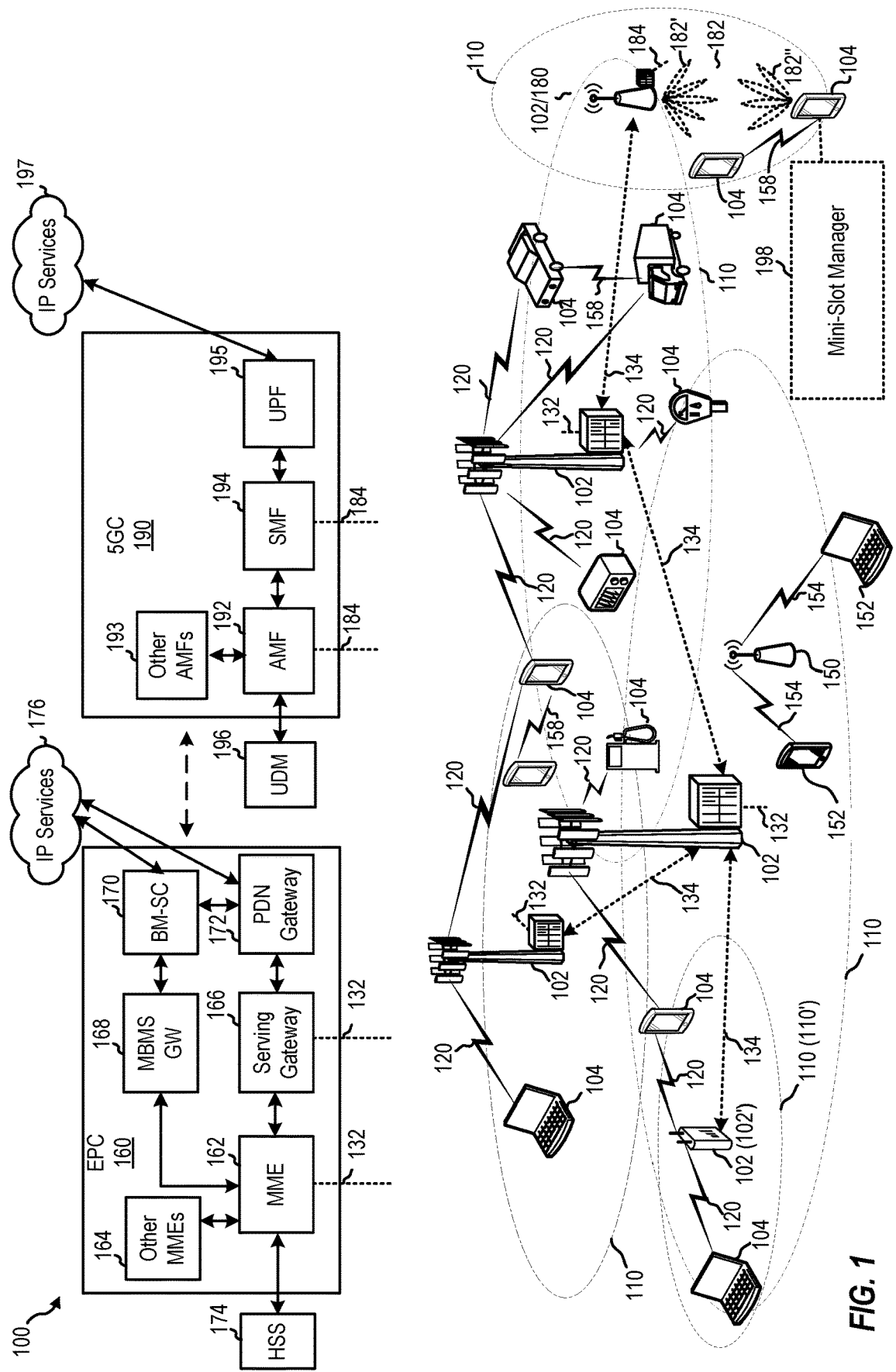
FIG. 1 is a block diagram conceptually illustrating an example wireless communication network.

Aspects of the present disclosure provide apparatuses, methods, processing systems, and computer-readable mediums for gain control at a device for sidelink communications. For example, certain aspects provide techniques for automatic gain control (AGC) at a user equipment (UE) for sidelink signals received from one or more other UEs. Though certain aspects are described with respect to sidelink communications, it should be noted that such aspects may similarly apply to other types of communications.

A first user equipment (UE) may communicate with a second UE over an air interface using a device-to-device (D2D) technique known as sidelink communication. In a sidelink communication, the first UE may transmit data and/or control information over a time window (e.g., a slot). In some examples, the first UE transmits an automatic gain control (AGC) signal in the time window, prior to transmitting the data and/or control information. The AGC signal transmitted by the first UE is configured to allow the second UE (which is receiving the transmission) to adjust the gain it applies, to a received signal carrying the data and/or control information, in the analog domain before passing the signal to an analog-to-digital converter (ADC) to convert the signal into the digital domain for further processing and/or decoding. The second UE applies a gain to the received signal, thereby adjusting an amplitude of the signal which adjusts a power of the signal. The gain may increase the power of the signal, or decrease the power of the signal.

For example, the AGC signal allows the second UE to adjust its gain so that the received signal carrying the data and/or control information is more likely within a power range that the ADC is capable of operating on, such as without clipping. For example, the first UE may be configured to transmit the AGC signal with a same power or approximately a same power as the signal carrying the data and/or control information in the time window. The second UE, upon receiving the AGC signal (e.g., and any other additional signals or noise), is able to determine a received power at which the second UE receives the AGC signal (e.g., and the any other additional signals or noise). The second UE assumes that such received power is the same power at which it will receive the signal carrying the data and/or control information (e.g., and any other additional signals or noise). Accordingly, the second UE adjusts its gain so that the second UE, if applying the adjusted gain to the AGC signal (e.g., and the any other additional signals or noise), would result in the AGC signal being within the power range of the ADC. Thus, when the second UE receives the signal carrying the data and/or control information, it applies the adjusted gain, such that the resulting signal is likely within the power range of the ADC.

Failure to make the gain adjustment may cause the ADC to "clip" portions of the transmission that exceed the ADC range. Similarly, if the strength of the transmission, from the perspective of the second UE, is too low, underflow may occur. In either case, the second UE may use the AGC signal at the beginning of the transmission to determine how much gain adjustment is needed to optimize the received signaling for proper conversion by the ADC. Accordingly, the second UE can use the AGC signal on a time window by time window basis to adjust gain per time window.

In some sidelink communications, multiple UEs may be communicating in close proximity to each other. For example, in an industrial internet of things (IIoT) application of sidelink communication, multiple machines in the same location may be communicating with each other simultaneously. Such communications may use "mini-slots" for communication, whereby a UE may transmit signaling that uses less than the entire time window. As an example, a typical slot may be comprised of fourteen symbols, but a mini-slot may use just four symbols. Accordingly, one or more UEs may communicate in a slot, such as a given UE transmitting in multiple mini-slots of a slot, separate UEs transmitting in different mini-slots of the slot, or a combination thereof.

In certain aspects, a UE, such as the discussed second UE, is configured to assume that all UEs participating in sidelink communication in a time window are configured to start and end transmission at the boundaries of the time window, meaning the beginning and the end of the time window. For example, the second UE may be configured to assume that a first symbol in time of a slot is a symbol in which any AGC signal(s) transmitted from one or more other UEs will be received, and thus the second UE can adjust its gain based on the power of signaling received in the first symbol (also referred to as an "AGC symbol").

However, where UEs are configured to transmit in mini-slots, a UE may begin transmission in a mini-slot that is in the middle of the slot, meaning the transmission in the mini-slot does not occupy the first symbol in time of the slot. This may cause an issue with AGC at the second UE. For example, a first UE may begin transmission in a first slot by transmitting an AGC signal in a first symbol in time of the first slot, and continuing transmission throughout the first slot. A third UE may begin transmission in a mini-slot in the first slot that starts at a symbol other than the first symbol in time of the first slot. The second UE may adjust its gain based on the AGC signal (e.g., and any other signals) received in the first symbol. However, if the third UE is not transmitting in the first symbol, the second UE may not account for signals transmitted by the third UE when adjusting its gain. Accordingly, when the third UE starts transmitting in the mini-slot, both the first UE and the third UE signaling are received at the second UE. The second UE gain is adjusted only for the first UE signal, though, so the combined reception of the first UE and third UE signaling may result in a combined signal with a power greater than the ADC range after gain adjustment is applied. The same problem may exist even if the mini-slot transmission is not intended for the second UE, because the slot transmission by the first UE plus the mini-slot transmission by the third UE (e.g., seen as noise by the second UE) are still received at second UE.

Thus, aspects of the disclosure are directed to a UE being configured to transmit an AGC signal in a first symbol in time of a slot when transmitting in a mini-slot of the slot that does not begin at the first symbol in time of the slot. For example, the UE may transmit an AGC signal in the first symbol in time of the slot, refrain from transmitting for one or more symbols after and adjacent in time to the transmission of the AGC signal, and then transmit (e.g., data and/or control information) in one or more mini-slots of the slot after the one or more symbols in time. Accordingly, in certain aspects, any UEs transmitting in the slot are configured to transmit an AGC signal in the first symbol in time of the slot, whether they are transmitting in the entire slot, or one or more mini-slots. Thus, any UEs receiving signals in the slot are able to adjust their gain taking into account the power of transmission from any UEs transmitting in the slot, based on performing AGC based on signals received in the first symbol of the slot. Such techniques may provide better gain control at the UE, thereby leading to a higher likelihood that signals are properly decoded at the UE.

Certain aspects further provide techniques for a power level a UE transmits an AGC signal in the first symbol in time of a slot. An appropriate power level may further help ensure that any receiving UE is better able to adjust gain so that it is more likely that any received signaling is within a power range of the ADC of the UE.

Certain aspects further provide techniques for a frequency bandwidth over which a UE transmits an AGC signal in the first symbol in time of a slot. An appropriate bandwidth may further help ensure that any receiving UE is better able to adjust gain so that it is more likely that any received signaling is within a power range of the ADC of the UE.

Certain aspects further provide techniques for a what type of information/signal an AGC signal is based on. An appropriate signal may further help ensure that any receiving UE is better able to adjust gain so that it is more likely that any received signaling is within a power range of the ADC of the UE.

Certain aspects further provide techniques for one or more specific beams over which a UE transmits an AGC signal in the first symbol in time of a slot. An appropriate one or more beams may further help ensure that any receiving UE is better able to adjust gain so that it is more likely that any received signaling is within a power range of the ADC of the UE.

Introduction to Wireless Communication Networks

FIG. 1 depicts an example of a wireless communications system 100, in which aspects described herein may be implemented.

Generally, wireless communications system 100 includes base stations (BSs) 102, user equipments (UEs) 104, one or more core networks, such as an Evolved Packet Core (EPC) 160 and 5G Core (5GC) network 190, which interoperate to provide wireless communications services.

Base stations 102 may provide an access point to the EPC 160 and/or 5GC 190 for a user equipment 104, and may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, delivery of warning messages, among other functions. Base stations may include and/or be referred to as a gNB, NodeB, eNB, ng-eNB (e.g., an eNB that has been enhanced to provide connection to both EPC 160 and 5GC 190), an access point, a base transceiver station, a radio base station, a radio transceiver, or a transceiver function, or a transmission reception point in various contexts.

Base stations 102 wirelessly communicate with UEs 104 via communications links 120. Each of base stations 102 may provide communication coverage for a respective geographic coverage area 110, which may overlap in some cases. For example, small cell 102' (e.g., a low-power base station) may have a coverage area 110' that overlaps the coverage area 110 of one or more macrocells (e.g., high-power base stations).

The communication links 120 between base stations 102 and UEs 104 may include uplink (UL) (also referred to as reverse link) transmissions from a user equipment 104 to a base station 102 and/or downlink (DL) (also referred to as forward link) transmissions from a base station 102 to a user equipment 104. The communication links 120 may use multiple-input and multiple-output (MIMO) antenna technology, including spatial multiplexing, beamforming, and/or transmit diversity in various aspects.

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), a physical sidelink feedback channel (PSFCH), and a physical sidelink control channel (PSCCH). D2D communication may be through a variety of wireless communications systems, such as for example, FlashLinQ, WiMedia, Bluetooth, ZigBee, Wi-Fi based on the IEEE 802.11 standard, 4G (e.g., LTE), or 5G (e.g., NR), to name a few options.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player, a camera, a game console, a tablet, a smart device, a wearable device, a vehicle, an electric meter, a gas pump, a large or small kitchen appliance, a healthcare device, an implant, a sensor/actuator, a display, or other similar devices. Some of UEs 104 may be internet of things (IoT) devices (e.g., parking meter, gas pump, toaster, vehicles, heart monitor, or other IoT devices), always on (AON) devices, or edge processing devices. UEs 104 may also be referred to more generally as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, or a client.

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, base station 180 and the UE 104 may each include a plurality of antennas, such as antenna elements, antenna panels, and/or antenna arrays to facilitate the beamforming.

In some cases, base station 180 may transmit a beamformed signal to UE 104 in one or more transmit directions 182'. UE 104 may receive the beamformed signal from the base station 180 in one or more receive directions 182". UE 104 may also transmit a beamformed signal to the base station 180 in one or more transmit directions 182". Base station 180 may also receive the beamformed signal from UE 104 in one or more receive directions 182'. Base station 180 and UE 104 may then perform beam training to determine the best receive and transmit directions for each of base station 180 and UE 104. Notably, the transmit and receive directions for base station 180 may or may not be the same. Similarly, the transmit and receive directions for UE 104 may or may not be the same.

Wireless network 100 further includes a mini-slot manager 198, which may be configured for transmission of mini-slots according to aspects of the disclosure.

Figure 2:
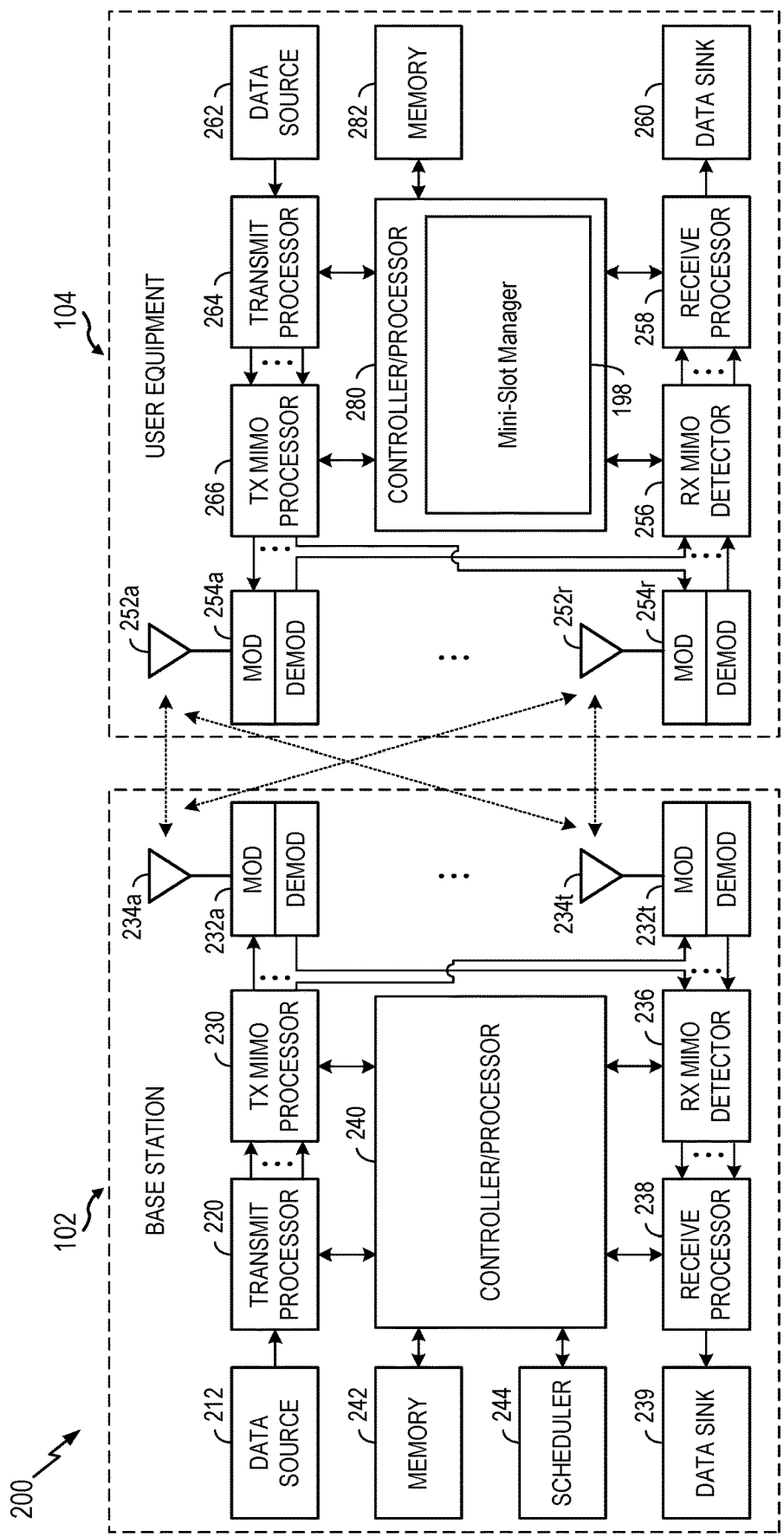
FIG. 2 is a block diagram conceptually illustrating aspects of an example of a base station and user equipment (UE).

FIG. 2 depicts aspects of an example base station (BS) 102 and a user equipment (UE) 104.

Generally, base station 102 includes various processors (e.g., 220, 230, 238, and 240), antennas 234a-t (collectively 234), transceivers 232a-t (collectively 232), which include modulators and demodulators, and other aspects, which enable wireless transmission of data (e.g., data source 212) and wireless reception of data (e.g., data sink 239). For example, base station 102 may send and receive data between itself and user equipment 104.

Generally, user equipment 104 includes various processors (e.g., 258, 264, 266, and 280), antennas 252a-r (collectively 252), transceivers 254a-r (collectively 254), which include modulators and demodulators, and other aspects, which enable wireless transmission of data (e.g., data source 262) and wireless reception of data (e.g., data sink 260).

User equipment 104 includes controller/processor 280, which may be configured to implement various functions related to wireless communications. In the depicted example, controller/processor 280 includes the mini-slot manager 198. Notably, while depicted as an aspect of controller/processor 280, the mini-slot manager 198 may be implemented additionally or alternatively in various other aspects of user equipment 104 in other implementations.

FIGS. 3A-3D depict aspects of data structures for a wireless communication network, such as wireless communication network 100 of FIG. 1. In particular, FIG. 3A is a diagram 300 illustrating an example of a first subframe within a 5G (e.g., 5G NR) frame structure, FIG. 3B is a diagram 330 illustrating an example of DL channels within a 5G subframe, FIG. 3C is a diagram 350 illustrating an example of a second subframe within a 5G frame structure, and FIG. 3D is a diagram 380 illustrating an example of UL channels within a 5G subframe.

Further discussions regarding FIG. 1, FIG. 2, and FIGS. 3A-3D are provided later in this disclosure.

Example Sidelink Slot Structures

Figure 4A:
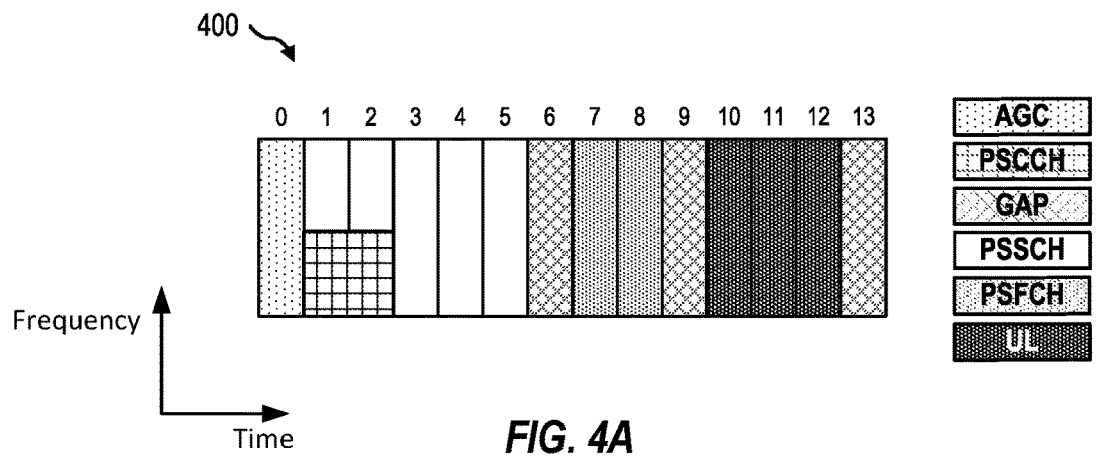
FIGS. 4A-4C are a block diagrams illustrating a slot structure and mini-slot structures for sidelink communication by a UE.
Figure 4B:
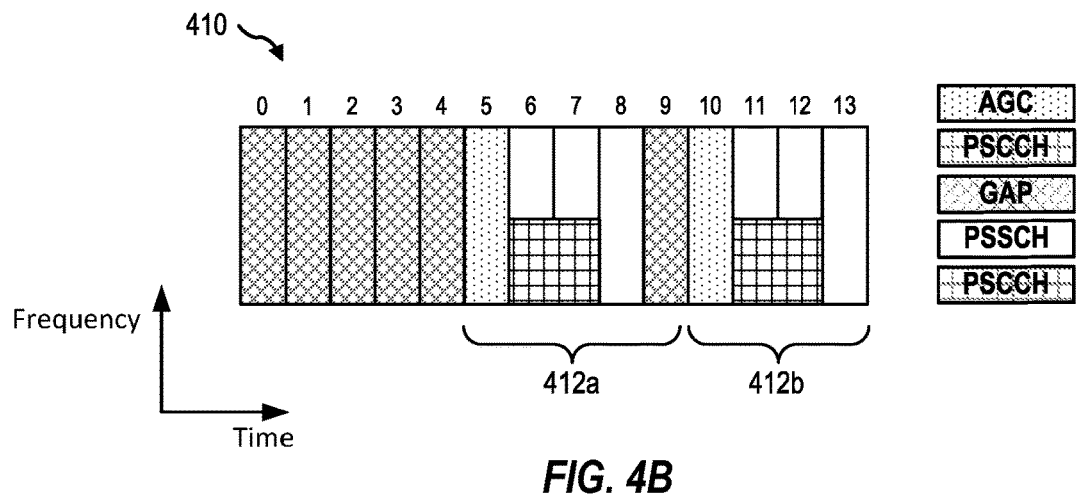
Figure 4C:
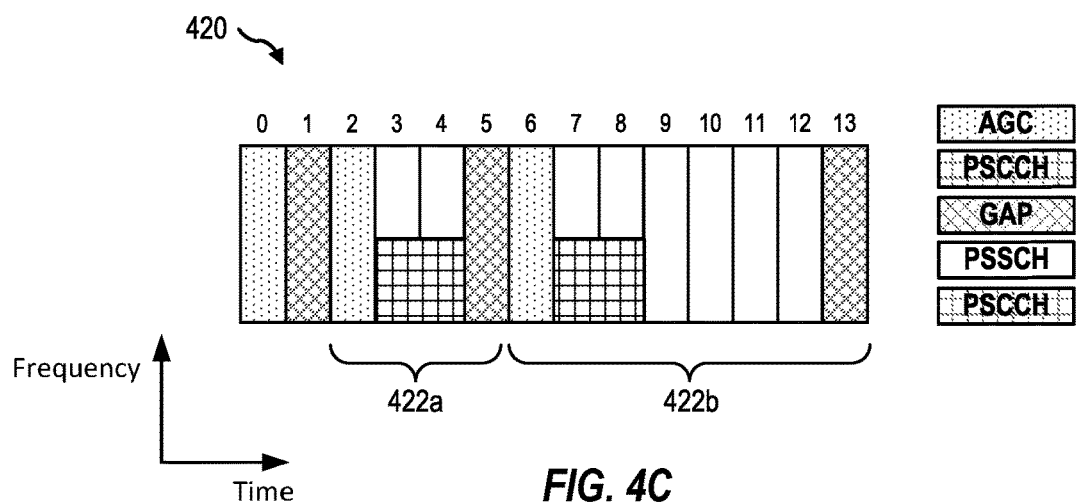

FIGS. 4A-4C are block diagrams illustrating a slot structure and mini-slot structures for sidelink communication by a given UE (e.g, UE 104 of FIGS. 1 and 2). In the slot structure 400 of FIG. 4A, an initial/first symbol in time (e.g., symbol 0) may be used by the UE to transmit an AGC signal. Symbols 1-5 may be used by the UE to transmit PSCCH and PSSCH. In certain aspects, the signals transmitted within the slot structure may be transmitted over a full range of a frequency bandwidth (e.g., a default frequency bandwidth) allocated to a UE. For example, a default frequency bandwidth may be the entire frequency bandwidth allocated to the UE. As illustrated, the PSCCH may be transmitted over less than the entire frequency bandwidth (e.g., the PSCCH is transmitted over a first subchannel). Symbol 6 may be a gap symbol. The gap symbol may provide time to allow for radio frequency (RF) front-end circuitry of a UE to be reconfigured for a next transmission/reception. In this example, the gap may allow the UE to adjust its RF front-end from transmission mode to receive mode, so that the UE can receive a PSFCH transmission from another UE over symbols 7 and 8. Similarly, symbol 9 provides another gap symbol to allow the UE to adjust its communication circuitry from receive mode to a transmit mode for transmitting uplink (UL) signaling (e.g., to a BS 102 of FIGS. 1 and 2). As discussed, slot structure 400 may correspond to communication in a full slot as opposed to one or more mini-slots.

FIG. 4B illustrates a first mini-slot structure 410 having a plurality of symbols arranged into multiple mini-slots 412. In this example, the first five symbols are gap symbols, where no signal is being transmitted. Thus, the UE refrains from transmitting over the first five symbols, and any other symbol identified as a gap symbol. Both of a second mini-slot 412a and a third mini-slot 412b are defined by an AGC signal in an initial symbol, PSCCH and PSSCH signals following the AGC signal, and a gap signal separating the second mini-slot 412a and the third mini-slot 412b. As discussed, mini-slot structure 410 may cause issues with gain adjustment at a UE receiving in the slot. Accordingly, certain aspects herein instead use a mini-slot structure similar to mini-slot structure 420, in which a first symbol is used for transmission of an AGC signal, even if the UE only transmits in mini-slots that start after the first symbol in time of the slot.

FIG. 4C illustrates a second mini-slot structure 420 having a plurality of symbols arranged into multiple mini-slots 422. In first mini-slot 422a, the UE transmits an AGC signal at symbol 2, PSCCH and PSSCH signals at symbols 3 and 4 (e.g., the PSCCH signals may be transmitted over a first subchannel, and the PSSCH signals may be transmitted over a second subchannel), and refrains from transmitting during a gap at symbol 5. In a second mini-slot 422b, the UE transmits an AGC signal at symbol 6, a PSCCH signal at symbol 7 and symbol 8, PSSCH signals at symbols 7-12, and refrains from transmitting during a gap at symbol 13. Further, though the mini-slots 422a and 422b in which the UE transmits begin at a symbol other than symbol 0, the UE still transmits an AGC signal at symbol 0, and refrains from transmitting during a gap at symbol 1, prior to transmitting in the mini-slots 422. The transmission of the AGC signal at symbol 0 may help a UE receiving in the slot adjust its gain in order to account for the transmission in mini-slots 422. It should be appreciated that the timing of the mini-slots 422 in mini-slot structure 420 is merely an example. For example, the UE may transmit in fewer or greater mini-slots, and any given mini-slot may start at any symbol (e.g., after symbol 1) in the slot. Further, different UEs may transmit in different mini-slots of the slot.

Although the term "slot" is frequently used to describe the time-domain resources of a sidelink transmission, it can be appreciated that any other suitable time window may be used with, or as an alternative, according to the features of this disclosure.

Aspects Related to Sidelink Communications

FIGS. 5A-5C are diagrams illustrating an example communication network 500 (e.g., a portion of wireless communication network 100 of FIG. 1) and example slot structures communicated in the network 500. In particular, FIGS. 5A-5C illustrate an example of sidelink communication where a central entity, such as a base station, schedules each UE with resources for transmission. Such a mode of sidelink communication may be referred to as mode 1 sidelink communication. It should be noted that the techniques discussed herein are not limited to such centrally scheduled modes of sidelink communication. For example, the techniques discussed herein may be similarly applicable to modes of sidelink communication where UEs self-select resources for transmission. Such a mode of sidelink communication may be referred to as mode 2 sidelink communication.

In FIG. 5A, a first UE 104a may receive scheduling and control information 502a from a BS 102, and a second UE 104b may also receive scheduling and control information 502b from the BS 102. The scheduling and control information 502 may provide the first UE 104a and the second UE 104b with time-domain and frequency-domain resources for sidelink communications with one or more other UEs. However, it should be noted that sidelink communications may be made between UEs without necessarily relying on scheduling or control from a base station. For example, UEs may use sidelink control information (SCI) to reserve self-selected resources for transmission and communicate such reservations to one another.

The first UE 104a may transmit a first sidelink signal to a third UE 104c using the slot structure 400 illustrated in FIG. 4A, having an AGC signal that occupies at least a first in time symbol of the slot structure 400. During the same duration of time, the second UE 104b may transmit a second sidelink signal to a fourth UE 104d using the first mini-slot structure 410 illustrated in FIG. 4B. In this example, although the third UE 104c is not the intended recipient of the second sidelink signal, the third UE 104 may still receive the second sidelink signal while receiving the first sidelink signal.

In some examples, a UE may determine a transmission power of an AGC signal based on a transmission power to be used to transmit signaling in symbols other than the AGC signal in the slot or mini-slot. Thus, the AGC signal may have a same transmission power as signals that are transmitted in the remaining symbols of a slot by the UE. In some examples, the AGC signal may be a copy of a signal that will be transmitted in a symbol that immediately follows the transmission of the AGC signal. By copying the following signal for use as AGC signal, the UE ensures that the bandwidth of the AGC signal is the same as the signals that follow it.

Upon receiving any signaling in the first symbol of the slot, including the AGC signal of the first UE 104a, the third UE 104c may adjust the gain of its RF front end for the slot to enable proper reception of signals in the slot. For example, the third UE 104c may adjust the gain of the RF front end and other processing units based on the power of a digitized RF signal at the output of an analog to digital converter (ADC). If, for example, the amplitude of the digitized RF signal is greater than the range of the ADC, the digitized signal may be clipped, resulting in decoding error. Similarly, if the amplitude of the digitized RF signal is too low, the signal may not be properly decoded. Thus, the third UE 104c may adjust its gain according to the received power of the AGC signal from the first UE 104a so that the digitized signal is within the ADC range. In certain aspects, the third UE 104c may adjust its gain on a slot-by-slot basis using AGC signals received at the beginning of each slot.

As illustrated in FIG. 5B, the slot structure 400 and the first mini-slot structure 410 only partially overlap in time because of the initial gap symbols of the first mini-slot structure 410. As such, the transmission power received by the third UE 104c may fluctuate between the time when the third UE 104c is only receiving the first sidelink signal, and the time when the third UE 104c is receiving both the first sidelink signal and the second sidelink signal. Thus, because the third UE 104c sets its gain according to received AGC signals at the beginning of each slot, the third UE 104c may set its gain to a level that is appropriate for receiving the first sidelink signal, but not for receiving both of the first sidelink signal and the second sidelink signal. Accordingly, when the third UE 104c receives the interference from the second sidelink signal, the ADC of the third UE 104c may be overwhelmed, resulting in clipping of the signal. This may prevent the third UE 104c from properly decoding either of the sidelink signals and may render any signals received during transmission of the second sidelink signal, useless. It should be noted that such interference may prevent the third UE 104c from properly decoding either of the first or second sidelink signals even if the sidelink signals are transmitted using different resource pools (e.g., adjacent frequency domain bandwidths).

Still referring to FIG. 5A, in an example of an alternative scenario, the second UE 104b may transmit a second sidelink signal to the fourth UE 104d using the second mini-slot structure 420 illustrated in FIG. 4C, having an AGC signal that occupies a first-in-time symbol, as well as two later symbols, of the second mini-slot structure 420. As illustrated in FIG. 5C, this scenario allows the third UE 104c to receive an AGC signal in the first symbol in time of the slot from both of the first UE 104a and the second UE 104b, and set its gain according to the power of the combined AGC signals. Thus, the third UE 104c may set its gain to a level that is appropriate for receiving both of the first sidelink signal and the second sidelink signal. Accordingly, when the third UE 104c receives the interference from then second sidelink signal, the ADC of the third UE 104c may not be overwhelmed. This will allow the third UE 104c to properly decode the signals and digitally filter out the interference caused by the second sidelink signal from the second UE 104b. Thus, although the first-in-time AGC signal of the second mini-slot structure 420 of FIG. 4C is followed by a gap symbol, that AGC signal may be used by the second UE 104b to indicate to other UEs (e.g., UEs that could potentially receive the signal as interference, or UEs that are not configured to decode mini-slots) that one or more mini-slots will be transmitted within the slot boundaries (e.g., within the same symbols/time resources).

The fourth UE 104d may receive the second sidelink signal, and may use the first-in-time AGC signal in the slot to set its gain prior to receiving the rest of the signal. However, in some examples, the fourth UE 104d may also or instead set its gain according to one or more of the AGC signals received over the second mini-slot structure 420. As such, the fourth UE 104d may have three opportunities to set its gain while receiving the second sidelink signal.

As illustrated in FIG. 4C, the first-in-time AGC signal may be followed by one or more gap symbols. In other words, the second UE 104b may not be able to copy a signal that will be transmitted in a symbol that immediately follows the AGC symbol. In certain aspects, such as in this scenario or other scenarios, the second UE 104b may generate a random sequence and transmit AGC signal in the first symbol in time of the slot according to (e.g., including) the generated sequence.

In some examples, the second UE 104b may use the entire bandwidth of its resource pool (e.g., frequency resources over which the second UE 104b is configured to transmit (e.g., data and/or control information) in the slot) to transmit an AGC signal in the first symbol in time of the slot. For example, if the resource pool bandwidth is defined by 10 resource blocks, then the second UE 104b may transmit the randomly generated sequence over 10 resource blocks.

In some examples, the second UE 104b may use a portion of its resource pool bandwidth to transmit an AGC signal in the first symbol in time of the slot. In an example, the second UE 104b and the fourth UE 104d may be configured with a mapping between a resource block index and a symbol, such that any resource blocks used to transmit the AGC signal in the first symbol in time of the slot may be mapped to future symbols (e.g., in the slot). For example, a first resource block may be mapped to a first symbol, a second resource block may be mapped to a second symbol, and so on. Thus, if the second UE 104b determines to transmit an AGC signal over third, fourth, and fifth resource blocks of an AGC symbol, the fourth UE 104d may determine that the second UE 104b will transmit a mini-slot occupying the third, fourth, and fifth symbols of the slot. In this manner, the second UE 104b can inform the fourth UE 104d of a schedule associated with transmission of mini-slots following the first-in-time AGC signal. Therefore, the second UE 104b may transmit the AGC signal in the first symbol in time of the slot in select resource blocks selected based on which symbols in which the second UE 104b is to transmit in mini-slots in the slot.

In some examples, the second UE 104b may use a default bandwidth (e.g., a default number of resource blocks, and/or particular resource blocks) to transmit an AGC signal in the first symbol in time of the slot. In some examples, the second UE 104b may use a bandwidth to transmit an AGC signal in the first symbol in time of the slot based on previous mini-slot transmission, such as, for example a historical average frequency bandwidth of bandwidths previously used for transmission of a number of mini-slot structures, and transmit an AGC signal over the determined bandwidth average.

In certain aspects, the second UE 104b may determine a transmission power for transmitting AGC signal in the first symbol in time of the slot that is not based on the transmission power of control or data signals that are transmitted over symbols immediately following the first symbol. In a first example, the second UE 104b may transmit the AGC signal in the first symbol in time at the same power used to transmit other signals, such as in a mini-slot, of the slot (e.g., the second UE 104b may determine a transmit power based on path loss between it and the fourth UE 104d). If different power levels are used for different mini-slots by the second UE 104b, the second UE 104b may transmit the AGC signal at the same power level as used for one of the mini-slots (e.g., the maximum among the mini-slots), at an average of the power levels of the mini-slots, or some other function of the power levels. In a second example, the second UE 104b may transmit the AGC signal in the first symbol in time at a power level that is an average of the power level used by the second UE 104b to transmit in the slot. For example, the second UE 104b may transmit in less than all symbols of the slot (e.g., in one or more mini-slots of the slot). Thus, in the example, the second UE 104b may transmit the AGC signal at a power used by the UE to transmit in each of the mini-slots, averaged over a duration of the entire slot (e.g., minus a first symbol in time and a last symbol in time of the slot).

In certain aspects, the second UE 104b may transmit the AGC signal at a power used by the UE to transmit in each of the mini-slots, averaged over a duration of the entire slot, but also indicates which symbols will not be used for transmission, such as by transmitting the AGC signal in certain resources in the frequency domain. Accordingly, a UE receiving such an AGC signal may further adjust its gain for symbols where it knows that a particular UE is not transmitting (e.g., increasing gain to account for the lack of transmission), such as where the UE is able to more quickly adjust gain between symbols, thereby achieving better gain control.

Figure 6B:
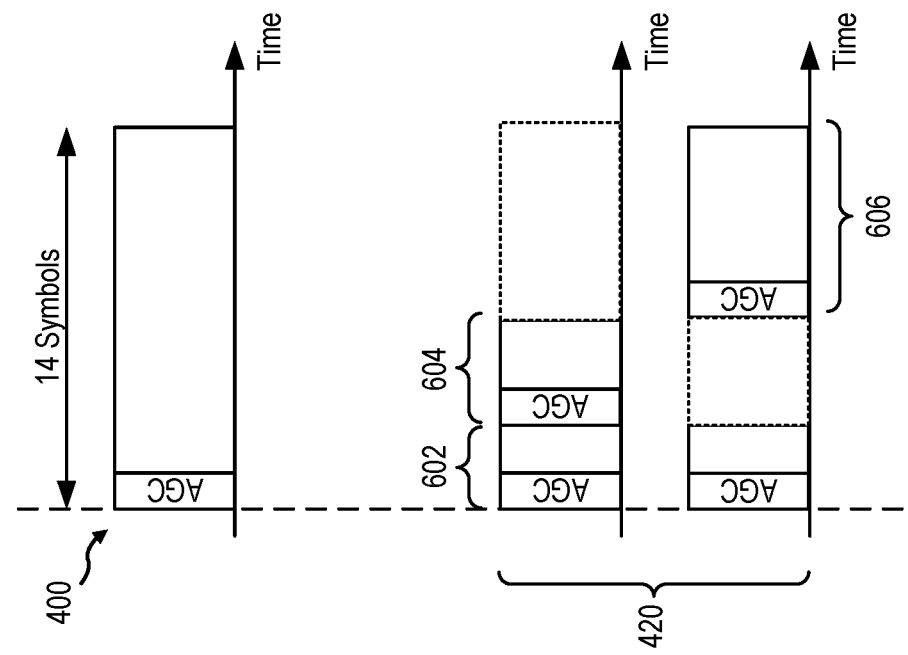
FIGS. 6A and 6B are diagrams illustrating an example communication network and example slot structures communicated in the network.
Figure 6A:
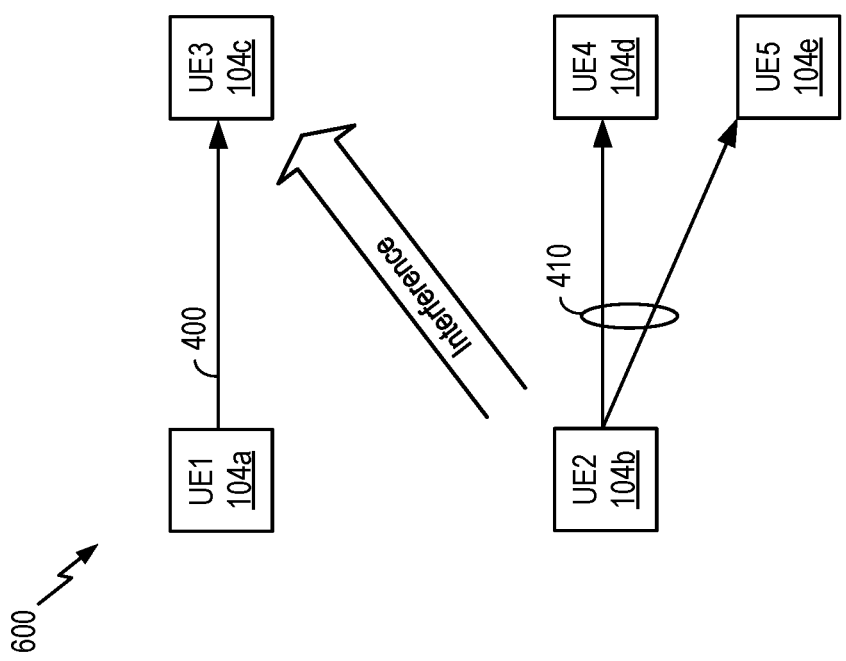

FIG. 6A is a block diagram illustrating an example communication network 600 (e.g., a portion of wireless communication network 100 of FIG. 1). In this example, a first UE 104a transmits a first sidelink communication to a third UE 104c, wherein the first sidelink communication is transmitted over a slot structure (e.g., slot structure 400 of FIG. 4A). The second UE 104b transmits a second sidelink communication to both a fourth UE 104d and a fifth UE 104e, wherein the second sidelink communication is transmitted over a mini-slot structure (e.g., the second mini-slot structure 420 of FIG. 4C) comprising a first-in-time AGC signal 602 in a first symbol of the slot, a first mini-slot 604 in the slot, and a second mini-slot 606 in the slot.

As illustrated in FIG. 6B, the signals of the first sidelink communication are transmitted over the same slot boundaries (e.g., the same symbols/time resources) as the signals of the second sidelink communication. FIG. 6B illustrates which signals of the second mini-slot structure 420 are intended to be received by the fourth UE 104d and the fifth UE 104e. In the second sidelink communication, the second UE 104b may transmit the first-in-time AGC signal 602 to both the fourth UE 104d and the fifth UE 104e, transmit the first mini-slot 604 to the fourth UE 104d, and transmit the second mini-slot 606 to the fifth UE 104e.

In certain aspects, the second UE 104b may use an omni-directional beam or a relatively broad beam (e.g., a beam width that encompasses the directions of the fourth UE 104d and the fifth UE 104e) to transmit/broadcast the first-in-time AGC signal 602. Accordingly, both the fourth UE 104d and the fifth UE 104e may receive the AGC signal 602 at a suitable power to adjust their respective gains. In some examples, the beam used to transmit the first-in-time AGC signal 602 may span multiple resource pools (e.g., transmission (e.g., frequency) resources for transmitting to the fourth UE 104d and transmission resources for transmitting to the fifth UE 104e). Here, the second UE 104b may transmit the first-in-time AGC signal 602 using a transmit power that is the same as a transmit power used for transmitting the first mini-slot 604 or the second mini-slot 606 (e.g., a maximum of the power level between the power used for transmitting the first mini-slot 604 and the power used for transmitting the second mini-slot 606). Alternatively, the second UE 104b may transmit the first-in-time AGC signal 602 using a transmit power that is equal to an average of transmit power used to transmit over the symbols of the second mini-slot structure 420 (e.g., all symbols of the slot minus the last symbol in time and the first symbol in time used for the AGC signal). Thus, in the example, the second UE 104b may transmit the AGC signal at a power used by the UE to transmit in each of the mini-slots, averaged over a duration of the entire slot (e.g., minus a first symbol in time and a last symbol in time of the slot).

In certain aspects, the second UE 104b may transmit the AGC signal at a power used by the UE to transmit in each of the mini-slots, averaged over a duration of the entire slot, but also indicates which symbols will not be used for transmission, such as by transmitting the AGC signal in certain resources in the frequency domain. Accordingly, a UE receiving such an AGC signal may further adjust its gain for symbols where it knows that a particular UE is not transmitting (e.g., increasing gain to account for the lack of transmission), such as where the UE is able to more quickly adjust gain between symbols, thereby achieving better gain control.

After transmitting the first-in-time AGC signal 602, the second UE 104b may transmit the first mini-slot 604 to the fourth UE 104d using a directed beam (e.g., directed to the direction of the fourth UE 104d) that is relatively narrower than the beam used for transmitting the first-in-time AGC signal 602. As illustrated in FIG. 4C, a gap symbol between the first-in-time AGC signal 602 and the first mini-slot 604 may provide the second UE 104b with time to adjust its RF front-end to change beam direction. After transmitting the first mini-slot 604, the second UE 104b may transmit the second mini-slot 606 to the fifth UE 104e using another directed beam (e.g., directed to the direction of the fifth UE 104e) that is relatively narrower than the beam used for transmitting the first-in-time AGC signal 602. The directed beam for the second mini-slot 606 may have the same or a different bandwidth than the directed beam for the first mini-slot 604.

Accordingly, in this example, the first-in-time AGC signal 602 may provide the third UE 104c with an indication of the level of interference it may receive. Because the beams used to transmit the first mini-slot 604 and the second mini-slot 606 are directed beams, the interference may be minimized. It should be noted that though only two UEs are shown transmitting an AGC signal in the first symbol in time of a slot in various examples for ease of illustration, any number of UEs may transmit an AGC signal in the first symbol in time of the slot. For example, in the example of FIG. 6A, fifth UE 104e may be configured to transmit in mini-slot 606 to second UE 102b, instead of vice versa. Thus, the third UE 104c may receive AGC signals from each of the first UE 104a, the second UE 104b, and the fifth UE 104e, and perform gain adjustment accordingly.

Example Method

Figure 7:
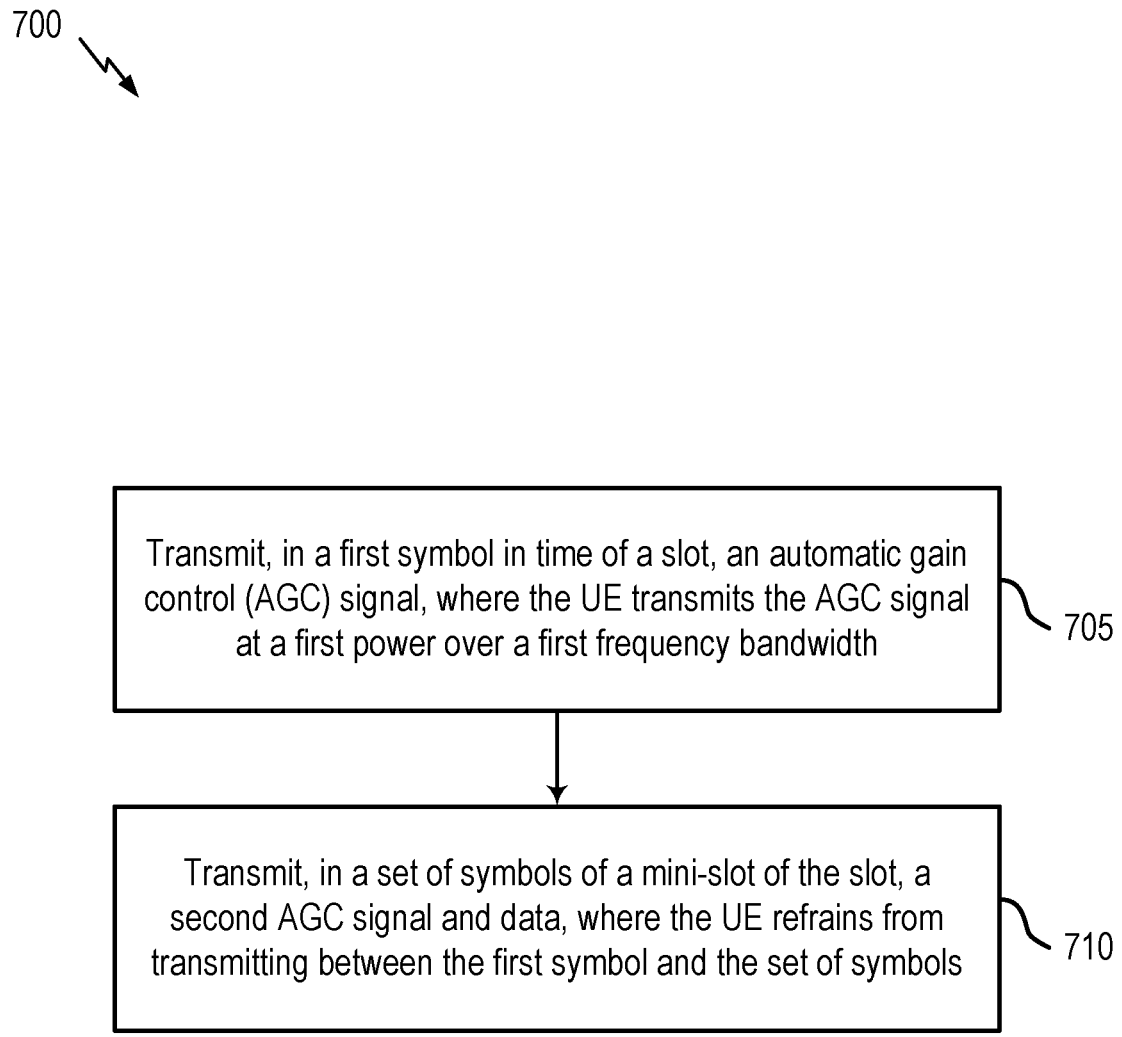
FIG. 7 shows an example method for gain control according to aspects of the present disclosure.

FIG. 7 shows an example of a method 700 for gain control according to aspects of the present disclosure. In some aspects, a user equipment, such as UE 104 of FIGS. 1 and 2, or processing system 805 of FIG. 8, may perform the method 700.

At operation 705, the system transmits, in a first symbol in time of a slot, an automatic gain control (AGC) signal, where the UE transmits the AGC signal at a first power over a first frequency bandwidth. In some cases, the operations of this step refer to, or may be performed by, an AGC signal circuitry as described with reference to FIG. 8. In some cases, the operations of this step refer to, or may be performed by, resource utilization circuitry as described with reference to FIG. 8.

At operation 710, the system transmits, in a set of symbols of a mini-slot of the slot, a second AGC signal and data, where the UE refrains from transmitting between the first symbol and the set of symbols. In some cases, the operations of this step refer to, or may be performed by, an AGC signal circuitry as described with reference to FIG. 8. In some cases, the operations of this step refer to, or may be performed by, a data circuitry as described with reference to FIG. 8. In some cases, the operations of this step refer to, or may be performed by, resource utilization circuitry as described with reference to FIG. 8.

In some aspects, the UE transmits the second AGC signal and the data at the first power. In some aspects, the first power comprises power used by the UE to transmit during the slot averaged over a duration of the slot. In some aspects, the AGC signal comprises a random sequence.

In some aspects, the UE transmits the second AGC signal and the data over the first frequency bandwidth. In some aspects, each resource of the first frequency bandwidth is associated with a different symbol of the plurality of symbols in which the data is transmitted. In some aspects, the first frequency bandwidth comprises a default frequency bandwidth for transmitting AGC signals in a first symbol in time of a given slot. In some aspects, the first frequency bandwidth is based on previous mini-slot transmissions.

In some aspects, the UE transmits the AGC signal using a first beam, and wherein the UE transmits the second AGC signal using a second beam that is narrower in beam width than the first beam.

In some aspects, the data comprises a physical sidelink shared channel.

In some aspects, the method 700 includes transmitting, in a second plurality of symbols of a second mini-slot of the slot, a third AGC signal and additional data. In some examples, the first frequency bandwidth comprises a second frequency bandwidth of the second AGC signal and a third frequency bandwidth of the third AGC signal.

In some aspects, the method 700 includes receiving, in a second plurality of symbols of a second mini-slot of the slot, a third AGC signal and additional data.

Example Wireless Communication Device

Figure 8:
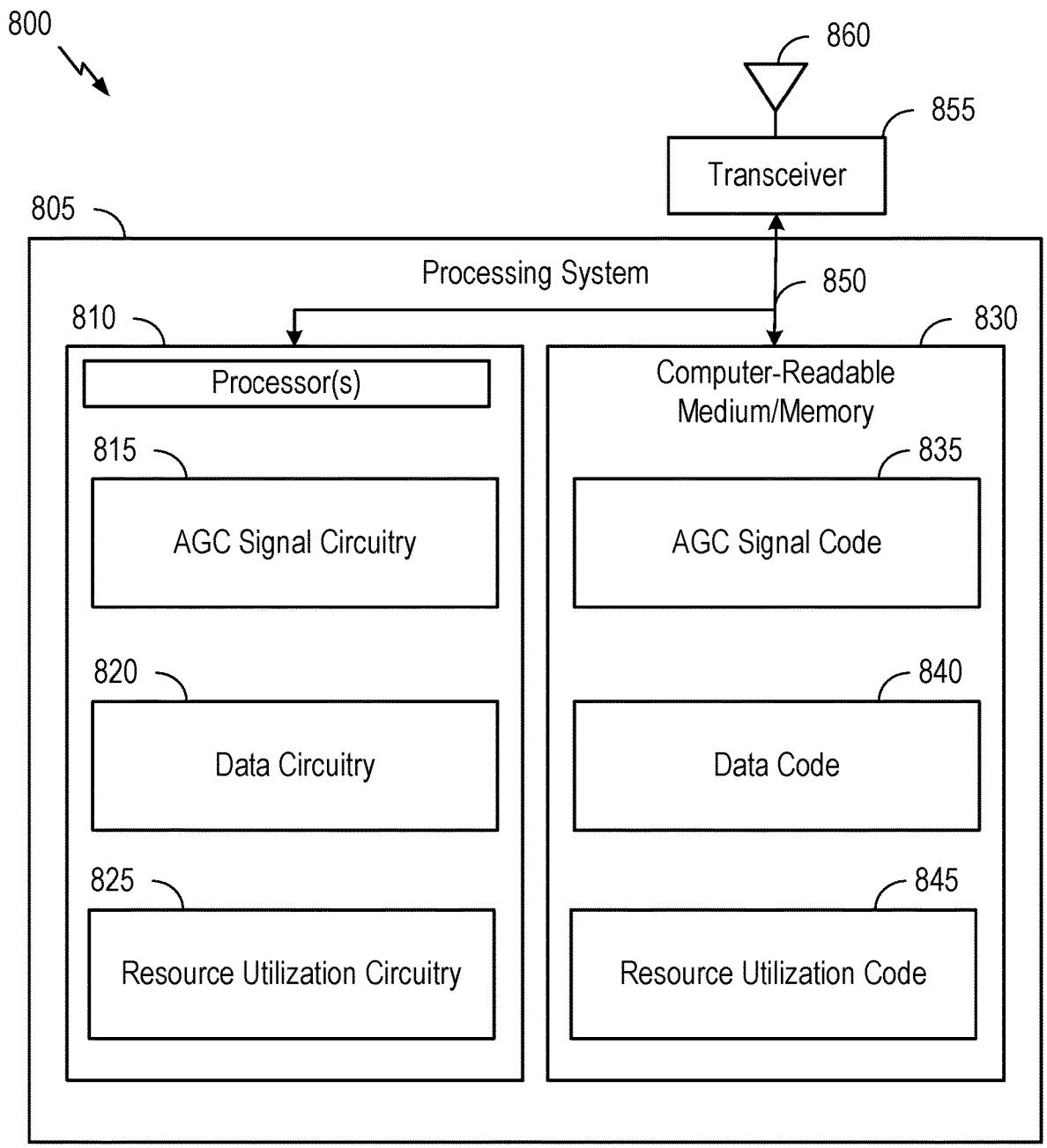
FIG. 8 shows an example of a communications device according to aspects of the present disclosure.

FIG. 8 depicts an example communications device 800 that includes various components operable, configured, or adapted to perform operations for the techniques disclosed herein, such as the operations depicted and described with respect to FIGS. 4-7. In some examples, communication device may be a user equipment 104 as described, for example with respect to FIGS. 1 and 2.

Communications device 800 includes a processing system 805 coupled to a transceiver 855 (e.g., a transmitter and/or a receiver). Transceiver 855 is configured to transmit (or send) and receive signals for the communications device 800 via an antenna 860, such as the various signals as described herein. A transceiver 855 may communicate bi-directionally, via antennas 860, wired, or wireless links as described above. For example, the transceiver 855 may represent a wireless transceiver 855 and may communicate bi-directionally with another wireless transceiver. The transceiver 855 may also include or be connected to a modem to modulate the packets and provide the modulated packets to for transmission, and to demodulate received packets. In some examples, transceiver 855 may be tuned to operate at specified frequencies. For example, a modem can configure the transceiver 855 to operate at a specified frequency and power level based on the communication protocol used by the modem.

Processing system 805 may be configured to perform processing functions for communications device 800, including processing signals received and/or to be transmitted by communications device 800. Processing system 805 includes one or more processors 810 coupled to a computer-readable medium/memory 830 via a bus 850.

In some examples, one or more processors 810 may include one or more intelligent hardware devices, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, the one or more processors 810 are configured to operate a memory array using a memory controller. In other cases, a memory controller is integrated into the one or more processors 810. In some cases, the one or more processors 810 are configured to execute computer-readable instructions stored in a memory to perform various functions. In some aspects, one or more processors 810 include special purpose components for modem processing, baseband processing, digital signal processing, or transmission processing.

In certain aspects, computer-readable medium/memory 830 is configured to store instructions (e.g., computer-executable code) that when executed by the one or more processors 810, cause the one or more processors 810 to perform the operations illustrated in FIGS. 4-7, or other operations for performing the various techniques discussed herein.

In one aspect, computer-readable medium/memory 830 includes AGC signal code 835, data code 840, and resource utilization code 845.

Examples of a computer-readable medium/memory 830 include random access memory (RAM), read-only memory (ROM), solid state memory, a hard drive, a hard disk drive, etc. In some examples, computer-readable medium/memory 830 is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

Various components of communications device 800 may provide means for performing the methods described herein, including with respect to FIGS. 4-7.

In some examples, means for transmitting or sending (or means for outputting for transmission) may include the transceivers 254 and/or antenna(s) 252 of the user equipment 104 illustrated in FIG. 2 and/or transceiver 855 and antenna 860 of the communication device in FIG. 8.

In some examples, means for receiving (or means for obtaining) may include the transceivers 254 and/or antenna (s) 252 of the user equipment 104 illustrated in FIG. 2 and/or transceiver 855 and antenna 860 of the communication device in FIG. 8.

In some examples, means for transmitting and/or receiving may include various processing system 805 components, such as: the one or more processors 810 in FIG. 8, or aspects of the user equipment 104 depicted in FIG. 2, including receive processor 258, transmit processor 264, TX MIMO processor 266, and/or controller/processor 280.

In one aspect, one or more processors 810 includes AGC signal circuitry 815, data circuitry 820, and resource utilization circuitry 825.

According to some aspects, AGC signal circuitry 815 transmits, in a first symbol in time of a slot, an AGC signal. The UE transmits the AGC signal at a first power over a first frequency bandwidth via resource utilization circuitry. In some examples, AGC signal circuitry 815 and data circuitry 820 transmit, in a set of symbols of a mini-slot of the slot, a second AGC signal and data. The UE (e.g., resource utilization circuitry 825) refrains from transmitting between the first symbol and the set of symbols.

In some aspects, the UE transmits the second AGC signal and the data at the first power (e.g., via AGC signal circuitry 815 and data circuitry 820). In some aspects, the first power includes power used by the UE to transmit during the slot averaged over a duration of the slot. In some aspects, the AGC signal includes a random sequence. In some aspects, the UE transmits the second AGC signal and the data over the first frequency bandwidth. In some aspects, each resource of the first frequency bandwidth is associated with a different symbol of the set of symbols in which the data is transmitted.

In some aspects, AGC signal circuitry 815 and resource utilization circuitry 825 establish the first frequency bandwidth that include a default frequency bandwidth for transmitting AGC signals in a first symbol in time of a given slot. In some aspects, the first frequency bandwidth is based on previous mini-slot transmissions. In some aspects, the UE transmits the AGC signal using a first beam, and where the UE transmits the second AGC signal using a second beam that is narrower in beam width than the first beam. In some aspects, the data includes a physical sidelink shared channel.

In some examples, AGC signal circuitry 815 transmits, in a second set of symbols of a second mini-slot of the slot, a third AGC signal and additional data, where the first frequency bandwidth includes a second frequency bandwidth of the second AGC signal and a third frequency bandwidth of the third AGC signal. In some examples, AGC signal circuitry 815 receives, in a second set of symbols of a second mini-slot of the slot, a third AGC signal and additional data.

Notably, FIG. 8 is just one example, and many other examples and configurations of communication device are possible.

Example Clauses

Implementation examples are described in the following numbered clauses:

Clause 1: A method of wireless communication by a UE, comprising: transmitting, in a first symbol in time of a slot, an AGC signal, wherein the UE transmits the AGC signal at a first power over a first frequency bandwidth; and transmitting, in a plurality of symbols of a mini-slot of the slot, a second AGC signal and data, wherein the UE refrains from transmitting between the first symbol and the plurality of symbols Clause 2: The method of Clause 1, wherein: the UE transmits the second AGC signal and the data at the first power.

Clause 3: The method of any one of Clauses 1-2, wherein: the first power comprises power used by the UE to transmit during the slot averaged over a duration of the slot.

Clause 4: The method of any one of Clauses 1-3, wherein: the AGC signal comprises a random sequence.

Clause 5: The method of any one of Clauses 1-4, wherein: the UE transmits the second AGC signal and the data over the first frequency bandwidth.

Clause 6: The method of any one of Clauses 1-5, wherein: each resource of the first frequency bandwidth is associated with a different symbol of the plurality of symbols in which the data is transmitted.

Clause 7: The method of any one of Clauses 1-6, wherein: the first frequency bandwidth comprises a default frequency bandwidth for transmitting AGC signals in a first symbol in time of a given slot.

Clause 8: The method of any one of Clauses 1-6, wherein: the first frequency bandwidth is based on previous mini-slot transmissions.

Clause 9: The method of any one of Clauses 1-8, wherein: the UE transmits the AGC signal using a first beam, and wherein the UE transmits the second AGC signal using a second beam that is narrower in beam width than the first beam.

Clause 10: The method of any one of Clauses 1-9, wherein: the data comprises a physical sidelink shared channel.

Clause 11: The method of any one of Clauses 1-10, further comprising: transmitting, in a second plurality of symbols of a second mini-slot of the slot, a third AGC signal and additional data, wherein the first frequency bandwidth comprises a second frequency bandwidth of the second AGC signal and a third frequency bandwidth of the third AGC signal.

Clause 12: The method of any one of Clauses 1-11, further comprising: receiving, in a second plurality of symbols of a second mini-slot of the slot, a third AGC signal and additional data.

Clause 13: A processing system, comprising: a memory comprising computer-executable instructions; one or more processors configured to execute the computer-executable instructions and cause the processing system to perform a method in accordance with any one of Clauses 1-12.

Clause 14: A processing system, comprising means for performing a method in accordance with any one of Clauses 1-12.

Clause 15: A non-transitory computer readable medium storing code for wireless communication by a user equipment (UE), the code comprising instructions executable by a processor to cause the UE to perform a method in accordance with any one of Clauses 1-12.

Clause 16: A computer program product embodied on a computer-readable storage medium comprising code for performing a method in accordance with any one of Clauses 1-12.

Additional Wireless Communication Network Considerations

The techniques and methods described herein may be used for various wireless communications networks (or wireless wide area network (WWAN)) and radio access technologies (RATs). While aspects may be described herein using terminology commonly associated with 3G, 4G, and/or 5G (e.g., 5G new radio (NR)) wireless technologies, aspects of the present disclosure may likewise be applicable to other communication systems and standards not explicitly mentioned herein.

5G wireless communication networks may support various advanced wireless communication services, such as enhanced mobile broadband (eMBB), millimeter wave (mmWave), machine type communications (MTC), and/or mission critical targeting ultra-reliable, low-latency communications (URLLC). These services, and others, may include latency and reliability requirements.

Returning to FIG. 1, various aspects of the present disclosure may be performed within the example wireless communication network 100.

In 3GPP, the term "cell" can refer to a coverage area of a NodeB and/or a narrowband subsystem serving this coverage area, depending on the context in which the term is used. In NR systems, the term "cell" and BS, next generation NodeB (gNB or gNodeB), access point (AP), distributed unit (DU), carrier, or transmission reception point may be used interchangeably. A BS may provide communication coverage for a macro cell, a pico cell, a femto cell, and/or other types of cells.

A macro cell may generally cover a relatively large geographic area (e.g., several kilometers in radius) and may allow unrestricted access by UEs with service subscription. A pico cell may cover a relatively small geographic area (e.g., a sports stadium) and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG) and UEs for users in the home). A BS for a macro cell may be referred to as a macro BS. A BS for a pico cell may be referred to as a pico BS. A BS for a femto cell may be referred to as a femto BS, home BS, or a home NodeB.

Base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). Base stations 102 configured for 5G (e.g., 5G NR or Next Generation RAN (NG-RAN)) may interface with 5GC 190 through second backhaul links 184. Base stations 102 may communicate directly or indirectly (e.g., through the EPC 160 or 5GC 190) with each other over third backhaul links 134 (e.g., X2 interface). Third backhaul links 134 may generally be wired or wireless.

Small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. Small cell 102', employing NR in an unlicensed frequency spectrum, may boost coverage to and/or increase capacity of the access network.

Some base stations, such as gNB 180 may operate in a traditional sub-6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station.

The communication links 120 between base stations 102 and, for example, UEs 104, may be through one or more carriers. For example, base stations 102 and UEs 104 may use spectrum up to Y MHz (e.g., 5, 10, 15, 20, 100, 400, and other MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Wireless communications system 100 further includes a Wi-Fi access point (AP) 150 in communication with Wi-Fi stations (STAs) 152 via communication links 154 in, for example, a 2.4 GHz and/or 5 GHz unlicensed frequency spectrum. When communicating in an unlicensed frequency spectrum, the STAs 152/AP 150 may perform a clear channel assessment (CCA) prior to communicating in order to determine whether the channel is available.

EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to the IP Services 176, which may include, for example, the Internet, an intranet, an IP Multimedia Subsystem (IMS), a PS Streaming Service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and may be used to schedule MBMS transmissions. MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

5GC 190 may include an Access and Mobility Management Function (AMF) 192, other AMFs 193, a Session Management Function (SMF) 194, and a User Plane Function (UPF) 195. AMF 192 may be in communication with a Unified Data Management (UDM) 196.

AMF 192 is generally the control node that processes the signaling between UEs 104 and 5GC 190. Generally, AMF 192 provides QoS flow and session management.

All user Internet protocol (IP) packets are transferred through UPF 195, which is connected to the IP Services 197, and which provides UE IP address allocation as well as other functions for 5GC 190. IP Services 197 may include, for example, the Internet, an intranet, an IP Multimedia Subsystem (IMS), a PS Streaming Service, and/or other IP services.

Returning to FIG. 2, various example components of BS 102 and UE 104 (e.g., the wireless communication network 100 of FIG. 1) are depicted, which may be used to implement aspects of the present disclosure.

At BS 102, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), and others. The data may be for the physical downlink shared channel (PDSCH), in some examples.

A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

Processor 220 may process (e.g., encode and symbol map) the data and control information to obtain data symbols and control symbols, respectively. Transmit processor 220 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At UE 104, antennas 252a-252r may receive the downlink signals from the BS 102 and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM) to obtain received symbols.

MIMO detector 256 may obtain received symbols from all the demodulators in transceivers 254a-254r, perform MIMO detection on the received symbols if applicable, and provide detected symbols. Receive processor 258 may process (e.g., demodulate, deinterleave, and decode) the detected symbols, provide decoded data for the UE 104 to a data sink 260, and provide decoded control information to a controller/processor 280.

On the uplink, at UE 104, transmit processor 264 may receive and process data (e.g., for the physical uplink shared channel (PUSCH)) from a data source 262 and control information (e.g., for the physical uplink control channel (PUCCH) from the controller/processor 280. Transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM), and transmitted to BS 102.

At BS 102, the uplink signals from UE 104 may be received by antennas 234a-t, processed by the demodulators in transceivers 232a-232t, detected by a MIMO detector 236 if applicable, and further processed by a receive processor 238 to obtain decoded data and control information sent by UE 104. Receive processor 238 may provide the decoded data to a data sink 239 and the decoded control information to the controller/processor 240.

Memories 242 and 282 may store data and program codes for BS 102 and UE 104, respectively.

Scheduler 244 may schedule UEs for data transmission on the downlink and/or uplink.

5G may utilize orthogonal frequency division multiplexing (OFDM) with a cyclic prefix (CP) on the uplink and downlink. 5G may also support half-duplex operation using time division duplexing (TDD). OFDM and single-carrier frequency division multiplexing (SC-FDM) partition the system bandwidth into multiple orthogonal subcarriers, which are also commonly referred to as tones and bins. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers in some examples. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, and others).

As above, FIGS. 3A-3D depict various example aspects of data structures for a wireless communication network, such as wireless communication network 100 of FIG. 1.

In various aspects, the 5G frame structure may be frequency division duplex (FDD), in which for a particular set of subcarriers (carrier system bandwidth), subframes within the set of subcarriers are dedicated for either DL or UL. 5G frame structures may also be time division duplex (TDD), in which for a particular set of subcarriers (carrier system bandwidth), subframes within the set of subcarriers are dedicated for both DL and UL. In the examples provided by FIGS. 3A and 3C, the 5G frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description below applies also to a 5G frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. In some examples, each slot may include 7 or 14 symbols, depending on the slot configuration.

For example, for slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission).

The number of slots within a subframe is based on the slot configuration and the numerology. For slot configuration 0, different numerologies (μ) to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and 2μ slots/subframe. The subcarrier spacing and symbol length/duration are a function of the numerology. The subcarrier spacing may be equal to $2^\mu \times 15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 3A-3D provide an example of slot configuration 0 with 14 symbols per slot and numerology μ=2 with 4 slots per subframe. The slot duration is 0.25 ms, the subcarrier spacing is 60 kHz, and the symbol duration is approximately 16.67 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 3A, some of the REs carry reference (pilot) signals (RS) for a UE (e.g., UE 104 of FIGS. 1 and 2). The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 3B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol.

A primary synchronization signal (PSS) may be within symbol 2 of particular subframes of a frame. The PSS is used by a UE (e.g., 104 of FIGS. 1 and 2) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 3C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 3D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Additional Considerations

The preceding description provides examples of mini-slot sidelink signaling in communication systems. The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The techniques described herein may be used for various wireless communication technologies, such as 5G (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, and others. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, and others. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment (see FIG. 1), a user interface (e.g., keypad, display, mouse, joystick, touchscreen, biometric sensor, proximity sensor, light emitting element, and others) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A user equipment (UE), comprising:
   a memory comprising executable instructions; and
   one or more processors configured to execute the instructions and cause the UE to:
      transmit, in a first symbol of a total number of symbols of a slot comprising one or more mini-slots, a first automatic gain control (AGC) signal at a first power over a first frequency bandwidth, wherein each mini-slot comprises a respective plurality of symbols of the total number of symbols; and
      transmit, in a first plurality of symbols of a first mini-slot of the one or more mini-slots, a second AGC signal and data.

2. The UE of claim 1, wherein the one or more processors are configured to execute the instructions and cause the UE to at least one of:
   transmit the second AGC signal and the data at the first power, or
   refrain from transmitting between the first symbol and the first plurality of symbols of the first mini-slot.

3. The UE of claim 1, wherein the first power comprises a transmission power to transmit the first AGC signal or an average power averaged over a duration of the slot to transmit the AGC signal.

4. The UE of claim 1, wherein the first AGC signal comprises a random sequence.

5. The UE of claim 1, wherein the one or more processors are configured to execute the instructions and cause the UE to transmit the second AGC signal and the data over the first frequency bandwidth.

6. The UE of claim 1, wherein each resource of the first frequency bandwidth is associated with a different symbol of the first plurality of symbols in which the data is transmitted.

7. The UE of claim 1, wherein the first frequency bandwidth comprises a default frequency bandwidth for transmitting AGC signals in a first symbol in time of a given slot.

8. The UE of claim 1, wherein the first frequency bandwidth is based on previous mini-slot transmissions.

9. The UE of claim 1, wherein the one or more processors are configured to execute the instructions and cause the UE to transmit the first AGC signal using a first beam, and the second AGC signal using a second beam that is narrower in beam width than the first beam.

10. The UE of claim 1, wherein the data comprises a physical sidelink shared channel.

11. The UE of claim 1, wherein the one or more processors are configured to execute the instructions and cause the UE to transmit, in a second plurality of symbols of a second mini-slot of the one or more mini-slots, a third AGC signal and additional data, and wherein the first frequency bandwidth comprises a second frequency bandwidth of the second AGC signal and a third frequency bandwidth of the third AGC signal.

12. The UE of claim 1, wherein the one or more processors are configured to execute the instructions and cause the UE to receive, in a second plurality of symbols of a second mini-slot of the one or more mini-slots, a third AGC signal and additional data.

13. A method for wireless communication by a user equipment (UE), comprising:
   transmitting, in a first symbol of a total number of symbols of a slot comprising one or more mini-slots, a first automatic gain control (AGC) signal at a first power over a first frequency bandwidth, wherein each mini-slot comprises a respective plurality of symbols of the total number of symbols; and
   transmitting, in a first plurality of symbols of a first mini-slot of the one or more mini-slots, a second AGC signal and data.

14. The method of claim 13, further comprising at least one of:
   transmitting the second AGC signal and the data at the first power; or
   refraining from transmitting between the first symbol and the first plurality of symbols of the first mini-slot.

15. The method of claim 13, wherein the first power comprises a transmission power to transmit the first AGC signal or an average power averaged over a duration of the slot to transmit the AGC signal.

16. The method of claim 13, wherein the AGC signal comprises a random sequence.

17. The method of claim 13, wherein the second AGC signal and the data are transmitted over the first frequency bandwidth.

18. The method of claim 13, wherein each resource of the first frequency bandwidth is associated with a different symbol of the first plurality of symbols in which the data is transmitted.

19. The method of claim 13, wherein the first frequency bandwidth comprises a default frequency bandwidth for transmitting AGC signals in a first symbol in time of a given slot.

20. The method of claim 13, wherein the first frequency bandwidth is based on previous mini-slot transmissions.

21. The method of claim 13, wherein the AGC signal is transmitted using a first beam, and wherein the second AGC signal is transmitted using a second beam that is narrower in beam width than the first beam.

22. The method of claim 13, wherein the data comprises a physical sidelink shared channel.

23. The method of claim 13, further comprising transmitting, in a second plurality of symbols of a second mini-slot of the one or more mini-slots, a third AGC signal and additional data, wherein the first frequency bandwidth comprises a second frequency bandwidth of the second AGC signal and a third frequency bandwidth of the third AGC signal.

24. The method of claim 13, further comprising receiving, in a second plurality of symbols of a second mini-slot of the one or more mini-slots, a third AGC signal and additional data.

25. A non-transitory computer readable medium storing code for wireless communication by a user equipment (UE), the code comprising instructions executable by one or more processors to cause the UE to:
- transmit, in a first symbol of a total number of symbols of a slot comprising one or more mini-slots, a first automatic gain control (AGC) signal at a first power over a first frequency bandwidth, wherein each mini-slot comprises a respective plurality of symbols of the total number of symbols; and
- transmit, in a first plurality of symbols of a first mini-slot of the one or more mini-slots, a second AGC signal and data.

* * * * *